Oct. 28, 1941.　　　J. E. GUINANE　　　2,260,450
METHOD OF FREEZING FOOD PRODUCTS
Filed April 24, 1940　　　4 Sheets-Sheet 1
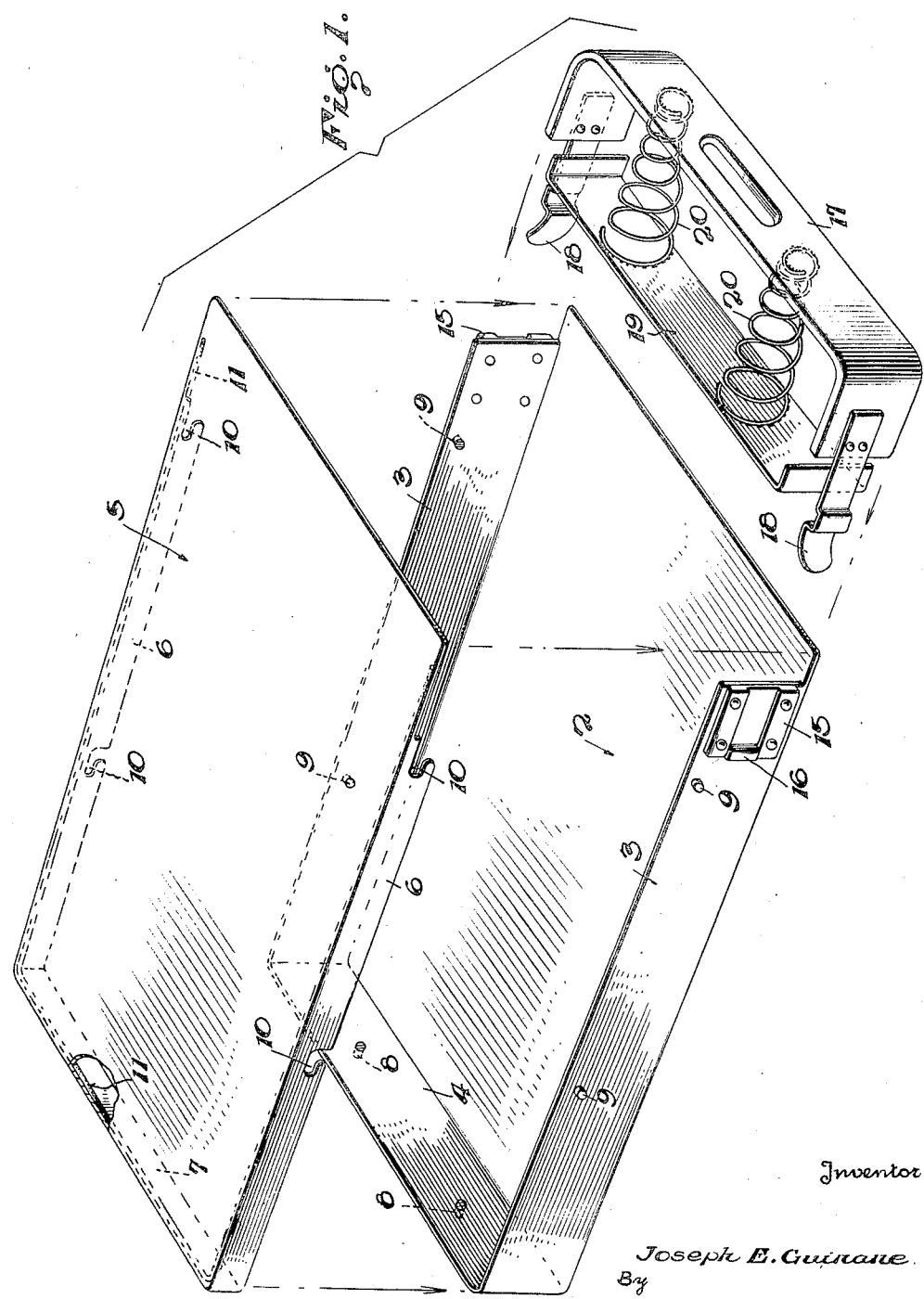
Inventor
Joseph E. Guinane
By
Cameron, Kerkam + Sutton
Attorneys

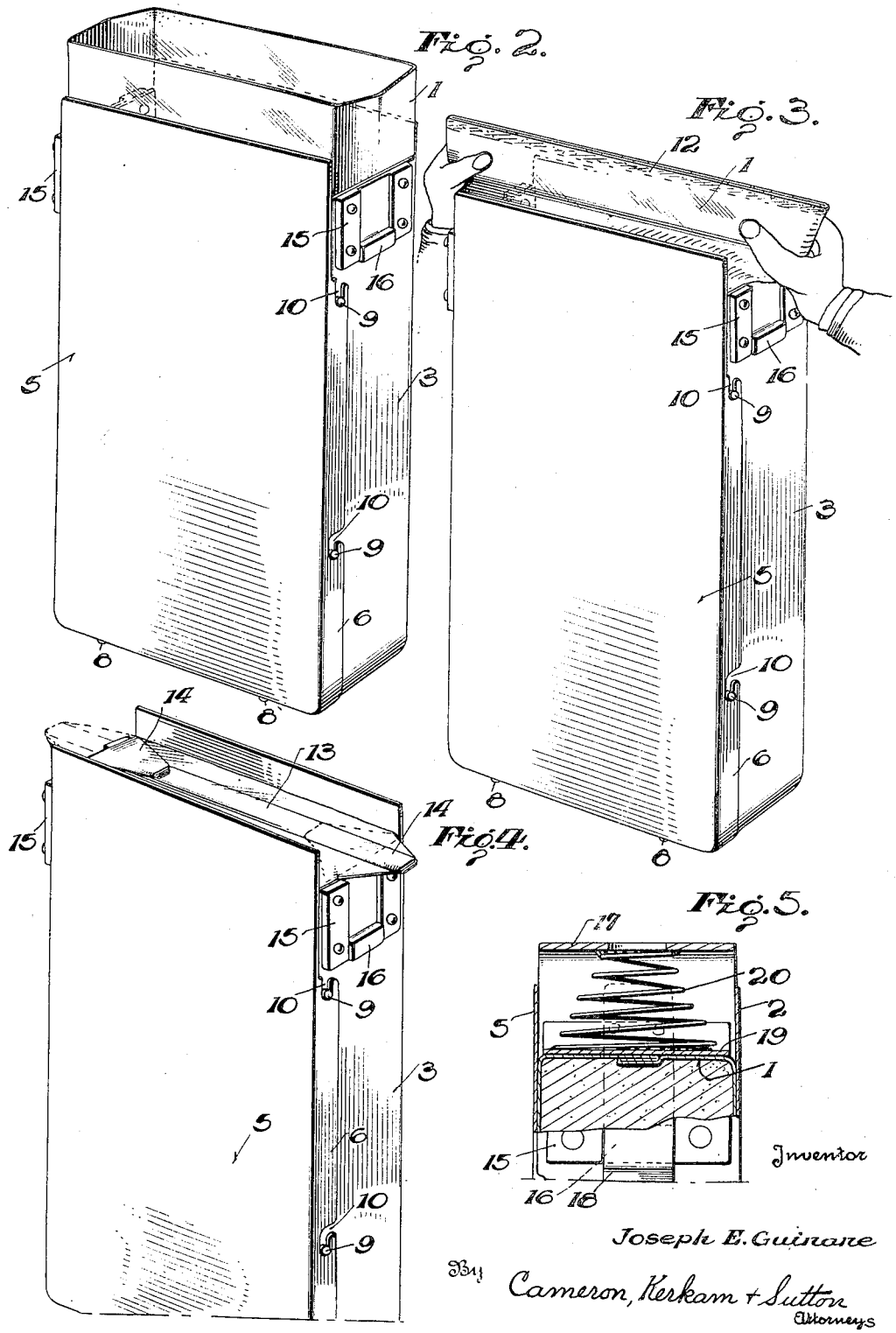

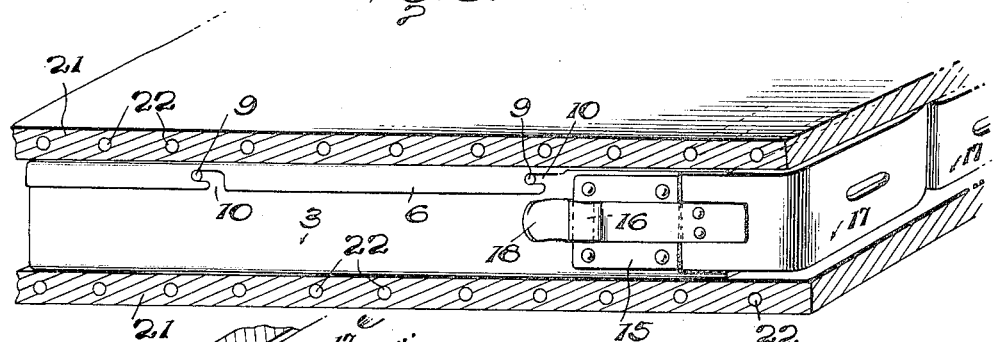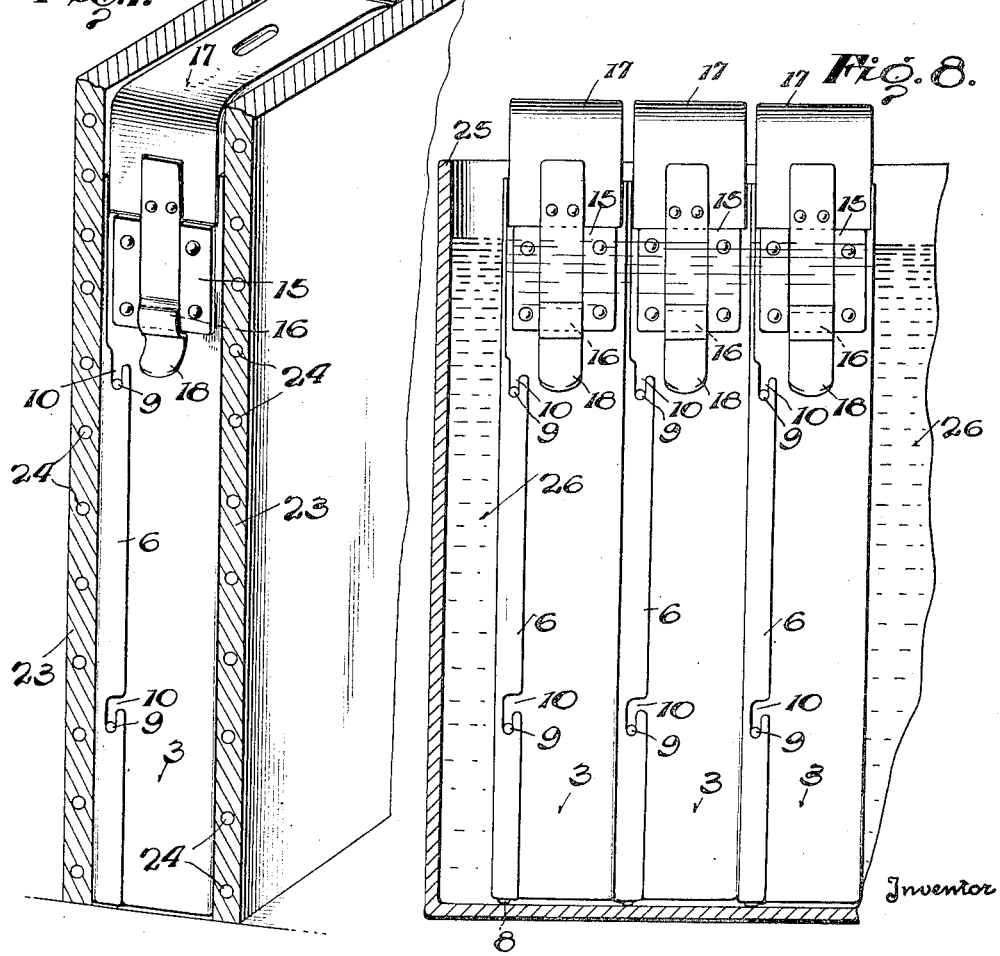

Oct. 28, 1941.     J. E. GUINANE     2,260,450
METHOD OF FREEZING FOOD PRODUCTS
Filed April 24, 1940     4 Sheets-Sheet 4
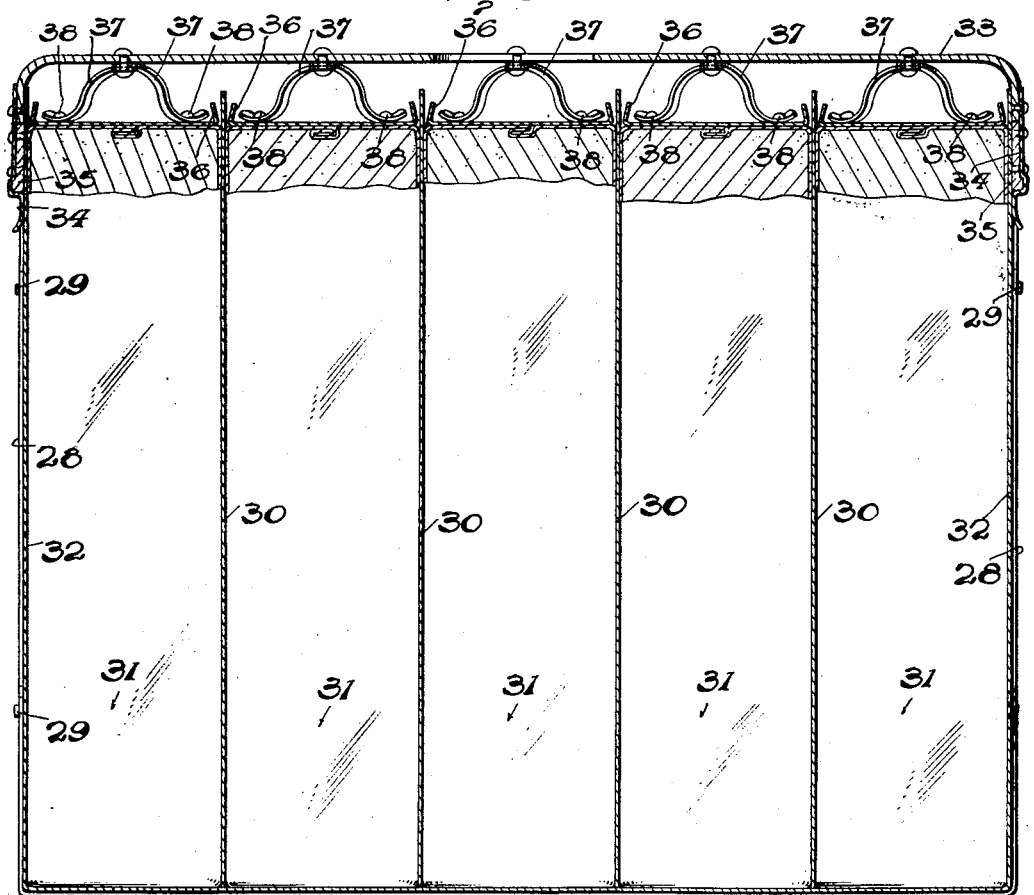
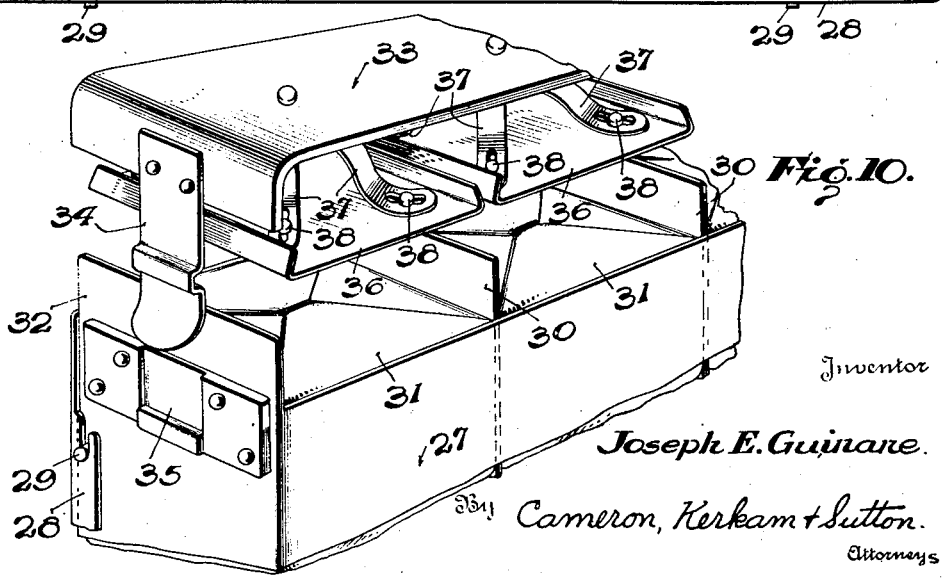
Inventor
Joseph E. Guinane.
By Cameron, Kerkam + Sutton.
Attorneys Patented Oct. 28, 1941

2,260,450

UNITED STATES PATENT OFFICE 2,260,450

METHOD OF FREEZING FOOD PRODUCTS

Joseph E. Guinane, White Plains, N. Y., assignor to General Foods Corporation, New York, N. Y., a corporation of Delaware Application April 24, 1940, Serial No. 331,458

10 Claims. (Cl. 62—173)

This invention relates to a method of freezing flowable food products such as liquids or semi-liquids in wrapped or packaged form and especially to rapid or quick-freezing of such products.

It is well known that foods can be satisfactorily preserved for long periods in the natural or fresh state by quick-freezing, whereby their pristine qualities and physical characteristics are substantially unchanged, together with freezing in compactly and substantially completely filled containers to minimize or prevent deterioration during freezing and storage due to oxidation, desiccation and the like. Freezing of liquids in metal containers such as tin cans has been proposed heretofore but is objectionable for various reasons. While rapid freezing is obtained with small containers, the rate of freezing is slowed down to an objectionable extent with large containers of the usual shapes. The cost and weight of such metal containers is excessive, and when of the conventional cylindrical shape, they require excessive space per unit of weight of product during cold storage and shipment. Furthermore space must be left within the containers to permit expansion of the contents to take place during freezing, with resulting deterioration in storage due to the presence of air in the containers. Moreover metal containers are difficult to open, and when filled with frozen product, cannot readily be emptied without first thawing the contents loose from the metal.

On the other hand, it has also been proposed to employ non-metallic moisture-proof containers such as relatively stiff, heavy cardboard, paperboard and the like. However, such materials do not possess sufficient inherent strength and rigidity to permit their use for large containers, and the insulating effect of the stiff, heavy materials required slows down the rate of freezing to an objectionable extent, even in the case of small containers such as individual cups. Moreover, the usual cylindrical or tapered cylindrical shape of such containers is objectionable for reasons explained above, while freezing liquids in thin cartons between horizontal refrigerated surfaces has heretofore been unsatisfactory because the flowable product does not remain in contact with the upper surface of the carton and freezing by conduction takes place from one side only.

It has also been proposed to employ relatively thin, flexible, moistureproof packaging or wrapping materials such as Cellophane. Such materials are desirable because, as compared with containers of the types referred to above, they are cheap and of materially less weight, and can be readily removed without thawing the product merely by tearing the wrapper off the frozen product. Furthermore with such materials the packages may readily and economically be made of any suitable size and shape to facilitate rapid freezing, particularly when freezing liquids for storage in relatively large units of say ten to fifty pounds or more. Preferably the individual units should be in the form of rectangular blocks which are relatively wide, flat and thin in order to provide wide flat areas on two sides through which heat may be extracted in the direction of the least dimension of the block to facilitate quick-freezing. Also such blocks can be stacked compactly during storage and shipment without waste space and as a substantially solid mass of frozen product without air circulation through the mass which might cause premature thawing.

Packages or wrappers of the above type, however, do not possess sufficient inherent strength and rigidity to be self-sustaining and tend to collapse when filled like ordinary paper bags. It has accordingly been proposed to place open-mouth bags of such materials on end in rigid molds in which they are filled with liquid and the liquid frozen, after which the frozen bags are removed from the molds and their mouths closed and sealed. This procedure, however, is objectionable for various reasons. Experience has shown that even very small quantities of air left in the packages will cause objectionable deterioration during storage, and tight wrapping and sealing of such bags or packages around the rigid frozen product, without leaving air-filled voids in the packages, is difficult to obtain particularly because the expansion of the product during freezing usually results in an uneven top surface. Also the irregular ends of such packages hinder compact stacking, cartoning, etc.

Furthermore it is of importance from the practical standpoint to be able to freeze the thin blocks described above between the horizontal plates of a multiplate freezer such as disclosed, for example, in U. S. Patent No. 1,905,131. Apparatus of this type is now in general use for freezing a variety of food products and it is obviously of advantage from the standpoint of cost to quick-freeze liquids in the same apparatus and thereby to avoid the necessity for special equipment. However, the tendency of the liquid contents of the flexible packages to seek their own level has heretofore made it impracticable to freeze such packages between horizontal plates because contact with the upper plate has not been maintained and the rate of freezing has been slowed down objectionably.

One of the objects of the present invention is to enable the filling, closing and sealing of flexible packages of the type characterized above before freezing and in such a manner as substantially to eliminate air from the packages while leaving room for expansion of the contents during freezing.

Another object is to freeze liquids or semiliquids in such packages or wrappers while controlling expansion during freezing to form uniform rectangular blocks of any suitable size.

A still further object is to enable the use of such packages of wide flat thin shape while maintaining contact with horizontal refrigerated elements on two sides thereof to obtain very rapid freezing.

The present invention comprises first confining the sides of the flexible package, preferably of the flat thin rectangular shape described above, sufficiently to render it capable of maintaining definitely its intended shape during filling, closing and sealing. In this condition the confined package and its contents form in effect a unit of definite, unchanging shape and the package is closed and sealed about its contents in such a manner as to eliminate air from the interior of the package and provide a tight wrapping for the still liquid and flowable product, while leaving space within the package for expansion of the product during freezing. The filled and sealed packages are then subjected to refrigeration to quick-freeze their contents while confining them within refrigerated heat-conductive walls, preferably of metal, and while maintaining one or more walls of the packages under yielding pressure. The yielding pressure prevents collapse of the packages and their contents during freezing and insures good contact with the refrigerated confining walls for efficient heat transfer, and permits expansion of the product to take place during freezing while controlling the expansion and shaping the package to maintain its uniform rectangular form. Thereafter the confining walls are removed, leaving a solid rectangular block of frozen liquid substantially without air voids and covered with a tightly wrapped and sealed packaging material frozen in intimate contact with the surfaces of the product.

The wrapping or packaging material is accordingly formed into rectangular bags having the desired cross-sectional size and shape and an open mouth for filling. For filling, closing and sealing, such bags may be placed in rigid pockets or molds each having the same cross section as the bags, or two or more such bags may be placed in a pocket or mold of the proper dimensions, the open mouths of the bags preferably projecting above the walls of the pockets or molds to facilitate closing and sealing as explained hereinafter. The rigid heat-conductive walls within which the filled and sealed packages are confined during freezing are suitably shaped to receive either a single package or a group of packages as may be desired, and to confine all sides and ends thereof. The yielding pressure is preferably applied to the sealed mouths of the bags because expansion of the contents normally takes place into the space left by sealing and the expanding contents are shaped while at the same time the folded mouths are held down by the pressure to form flat rectangular surfaces. The amount of pressure employed is preferably such as to maintain the surfaces of the packages in contact with the heat-conductive walls and to impart flat rectangular surfaces to the folded mouths of the bags.

It has been found convenient in practice to employ open-ended pockets or molds in which the bags are filled and sealed, and then to apply movable presser plates to the sealed mouths of the bags at the open ends of the molds for freezing. Where suitable, this procedure prevents duplication of equipment and eliminates handling of the bags themselves between filling and freezing, since the same walls are used for both filling and freezing and the bags do not need to be removed from the molds until frozen. In this case the walls of the molds are preferably separable to facilitate the removal of the frozen bags therefrom. In freezing large units of say fifty pounds, it has also been found preferable for ease of handling to employ individual molds for each bag. For convenience of illustration this procedure is used as an example hereinafter, but it will be understood that the procedure to be followed may vary according to conditions in any particular case.

Although it will be understood that the invention is applicable to the freezing of liquid or semiliquid products in general, the freezing of cream is hereinafter described as an example. It is well known that cream is subject to oxidation, absorption of foreign odors, bacterial contamination, and the like when exposed to air. Moreover, cream is an emulsion of water and fat held together by a proteinaceous emulsifying agent in the form of a lyophilic colloid of which the important constituent appears to be a protein known as haptein, and unless very rapidly frozen this proteinaceous emulsifying agent becomes coagulated or precipitated with the result that the emulsion is broken and the fat separates from the water. Hence the freezing of cream affords an apt illustration of the invention since complete filling and sealing of the packages to minimize or prevent exposure to air during freezing and storage, as well as very rapid freezing to prevent the dehydration of the protein and the consequent destruction of the emulsion, are necessary in order that the frozen and subsequently thawed cream may retain its natural fresh characteristics. In some cases it has also been observed that the tendency toward breakdown of the emulsion is less with higher fat concentrations, due probably to the removal from the cream by centrifuging of part of the casein which tends to coagulate on freezing and occlude a part of the emulsifying agent. Accordingly it may be desirable in some cases to concentrate the cream before packaging and freezing.

The following description and the accompanying drawings illustrate specifically one way of practicing the above process which has been used in practice with good results, but it will be understood that this embodiment of the invention is for purposes of illustration only and is not to be construed as a definition of the limits of the invention, reference being had to the appended claims for this purpose.

In the drawings,

Fig. 1 is a perspective view illustrating the several parts of an individual mold of the type described above which is used both for filling and freezing;

Fig. 2 is a perspective view showing the bag in the mold in position for filling;

Fig. 3 illustrates the operation of closing and sealing the bag;

Fig. 4 illustrates the folding of the sealed end of the bag;

Fig. 5 is a sectional view through the upper end of the mold showing the upper end of the filled bag with the movable presser plate in place;

Figs. 6, 7 and 8 illustrate diagrammatically suitable methods of refrigerating the molds;

Fig. 9 is a side view of a mold for a plurality of packages; and

Fig. 10 is a perspective view showing the application of the presser plate to the mold shown in Fig. 9.

The bag or package 1 may be of any suitable packaging or wrapping material such as treated waterproofed paper, Cellophane, rubber or rubber derivatives such as Pliofilm, etc., and is of relatively wide flat thin shape with a rectangular cross section and an open mouth. Preferably the bag is adapted for thermal sealing, as by making it of suitable thermoplastic material or by lining the open mouth of the bag with suitable sealing material, etc. As shown in Fig. 2, the bag 1 is first placed on end within a suitable mold with the open mouth of the bag preferably projecting above the top of the mold.

The mold may be of any suitable type, the form shown being intended for both filling and freezing operations as explained above and hence being separable for removal from the package after freezing. This mold (Fig. 1) comprises a shallow pan having a bottom wall 2, side walls 3, an end wall 4 and a separable top wall or cover 5, these parts when assembled forming the mold shown in Fig. 2 and having the same cross section as the bag 1. The cover 5 may be assembled with and secured to the other part of the mold in any suitable manner. As here shown, the cover 5 is provided with side flanges 6 and an end flange 7 which telescope around the side walls 3 and the end wall 4. Pins 8 project outwardly from the end wall 4 and engage suitable openings in the end flange 7 of the cover, and similar pins 9 on the side walls 3 engage in bayonet slots 10 in the flanges 6 of the cover. In this manner the parts of the mold are secured tightly together before the bag is placed therein as shown in Fig. 2 but are readily separable after freezing for removal of the bags. In some instances it may be desirable to provide the cover 5 with a suitable gasket 11 arranged to fit tightly against the top edges of the side walls 3 and end wall 4 when the parts of the mold are assembled.

After the bags are placed in the molds as shown in Fig. 2 they are filled with cream in any suitable manner, preferably to a point closely adjacent the ends of the side walls 3 of the mold which are shorter than the walls 2 and 5 as shown in Fig. 2. The open ends of the bags are then closed tightly around the cream in such a way as to eliminate substantially all air from the bags before they are sealed. As illustrated in Fig. 3, the operator grasps the mouth of the bag at both sides and brings it together tightly over the top of the cream, thereafter working his fingers toward the end of the bag while maintaining the opposite surfaces of the mouth tightly together and thus in effect "milking" the air out of the bag. The end of the bag is then suitably sealed as indicated by the shaded margin 12 in Fig. 3, for example, by the application of heat and pressure in any suitable manner. The sealed end of the bag is then folded tightly down on the top of the cream contained therein as indicated at 13 in Fig. 4, leaving end flaps 14 which are folded over on the top of the bag as indicated at the left-hand side of Fig. 4.

Before freezing the open end of the mold is closed by a plate which bears with yielding pressure on the sealed and folded end of the bag. In the form shown in Fig. 1, latch plates 15 having lugs 16 are secured to the side walls 3 of the mold. A U-shaped frame member 17 is provided with resilient latch arms 18 which snap over the lugs 16 and hold the frame member in place at the end of the mold. Carried by the frame member is a presser plate 19 adapted to engage the top of the bag in the mold and slidable between the projecting ends of the walls 2 and 5 of the mold. Coil springs 20 are interposed between the plate 19 and the frame 17, the opposite ends of these springs being secured respectively to the plate and to the frame. When this element is placed on the end of the mold, the plate 19 constitutes a movable end wall for the mold which engages the folded end of the bag with yielding pressure. As shown in cross section in Fig. 5, this presser plate holds down the folded seam of the bag and forms a rectangular end which is maintained during freezing.

When assembled, the complete mold and the enclosed filled bag constitute a unit which can be refrigerated in any suitable manner. Fig. 6 illustrates the use of a multiplate freezer of the type referred to above, a plurality of molds being placed on their sides between the horizontal refrigerating plates 21 which are brought into intimate contact with the wide flat faces of the molds and are refrigerated by the circulation of refrigerant through the passages 22 therein. Efficient heat transfer is obtained since the plates 21 are in contact with the walls of the mold over their entire area and since the bags and cream therein are maintained in contact with the walls of the mold by the pressure exerted by the plate 19. Since the bag is thin and heat is extracted from the cream from both sides, very rapid freezing is obtained.

In Fig. 7, a plurality of molds are placed on end between vertical plates 23 having refrigerating passages 24 therein. In Fig. 8, a plurality of molds are placed in a tank 25 containing refrigerant 26 which surrounds the molds up to a level substantially at the top of the bags therein.

Where it is desired to freeze cream or other flowable material in small units, and in order to avoid using a multiplicity of small molds, a subdivided mold of the type shown in Figs. 9 and 10 may be used. As shown the mold comprises a shallow pan 27 having a removable side or cover 28 which is attached to the pan by bayonet joints 29. Partitions 30 divide the pan into a plurality of pockets of suitable size which are here shown as five in number, each being shaped to receive a bag 31 of corresponding dimensions. The walls 32 of the mold, as well as the partitions 30, extend above the sides of the mold to provide for milking the air out of the bags and folding and sealing the mouths of the bags as described above, the bag folds in this case extending transversely of the mold between the partitions 30.

When the bags have been filled and their mouths sealed and folded as shown in Fig. 10, a frame 33 is secured to the mold by means of the cooperating latch arms 34 and latch plates 35, said frame carrying a plurality of presser plates 36 each of which engages the folded mouth of one of the bags with yielding pressure. In the form shown, a pair of crossed leaf springs 37 are secured to the frame 33 for each plate 36, the ends of said springs being slotted to receive studs 38 secured to said plates. Hence the presser plates are guided between the projecting ends of the partitions 30 and are kept level by the crossed leaf springs to form flat rectangular ends on the bags while yielding to permit expansion during freezing.

After freezing, the mold walls are readily removed from the frozen packages which are then ready for marketing or storage. It will be seen that the frozen units comprise solid, uniformly rectangular blocks which can be stacked compactly for storage and shipment, cartoned if desired, etc. These blocks of frozen product are tightly wrapped with the wrapping material frozen in intimate contact with the product over all the faces of the blocks, so that optimum protection against deterioration in storage is obtained. By "milking" the air out of the packages as explained above and then folding down the sealed ends of the bags and applying pressure, all unfilled spaces are eliminated and the packages are caused to assume and maintain the desired uniform rectangular shape during freezing. The folds at the sealed ends of the packages permit expansion to take place without rupturing the packages, and the yielding pressure permits such expansion and at the same time maintains rectangular ends with the folded seam of the bag pressed down flat as shown in Fig. 5.

The wrapping or packaging materials employed are inexpensive, add little to the weight of the cream, and can be torn readily from the frozen blocks when desired. The insulating effect of the thin flexible material is not sufficient to interfere substantially with rapid freezing, so that cream, for example, is not only protected against deterioration during storage but is preserved in its natural fresh state without any destruction of the emulsion or separation of fat. After long periods of storage such cream is practically indistinguishable when thawed from fresh cream.

In addition to the advantages discussed above, the use of yielding pressure is of particular advantage in enabling very rapid freezing of packages of liquid on their sides between horizontal refrigerating plates. This pressure counteracts the tendency of the liquid to seek its own level and maintains the liquid and the package in firm contact with the upper surface of the mold over its entire area so that heat is withdrawn efficiently from both sides of the package. Hence cream and other liquid or semiliquid products may be quick-frozen along with many other varieties of food in the same apparatus with the advantages of greater productivity and range of application of equipment and consequent economy of production.

It will be understood that the examples specifically described above are for purposes of illustration only and that other embodiments of the invention will now be apparent to those skilled in the art. For example, the invention may be employed to quick-freeze any liquid or semi-liquid product and may also be used advantageously with non-liquid products which are of such characteristics as to be readily flowable. Further the mold described above and illustrated in the drawings, while convenient and practical, is merely illustrative as other types of molds may be devised and apparatus other than individual molds may be employed as explained above. Hence reference is to be had to the appended claims for a definition of the limits of the invention.

What is claimed is:

1. The method of packaging and quick-freezing a flowable food product in a relatively thin collapsible rectangular container which comprises confining said container sufficiently to maintain its shape and prevent collapse, filling said confined container with said product, closing said container tightly around the confined flowable product to eliminate air from the container and sealing the confined container, then enclosing said container on all sides within refrigerated rigid heat-conductive walls to quick-freeze said product while maintaining at least one side under yielding pressure, and then removing said walls, whereby a tightly wrapped quick-frozen unit of rectangular shape is obtained.

2. The method of packaging and quick-freezing a flowable food product in a relatively thin flexible rectangular container which is not self-sustaining when filled with said product comprising the steps of confining said container to maintain its shape, filling the container while so confined to provide a rectangularly shaped mass of said flowable product and closing and sealing the top of the container about said confined mass, quick-freezing said product by confining the sides and bottom of the container within refrigerated, heat-conductive walls and applying yielding pressure to its top to maintain its rectangular shape while permitting expansion of said product during freezing, and then removing the quick-frozen package from said walls.

3. The method of wrapping and quick-freezing a flowable food product to form a quick-frozen wrapped unit of rectangular shape comprising the steps of forming wrapping material into a rectangular bag with an open mouth, confining the sides of the bag to maintain its shape while filling the bag and closing its mouth, quick-freezing the product in the bag by confining the bag under yielding pressure within refrigerated heat-conductive walls which maintain its shape while yielding to permit expansion during freezing, and then removing said walls whereby a quick-frozen wrapped unit of rectangular shape is obtained.

4. The method of producing a quick-frozen wrapped block of a normally flowable food product comprising filling said product into a relatively flat thin rectangular bag having an open mouth and sealing and folding the mouth of the bag while confining the sides of the bag within rigid walls to maintain its shape, quick-freezing said product in the bag while so confined by refrigerating said walls while applying yielding pressure to said folded mouth to maintain a flat rectangular surface and permit expansion to take place, and then removing said walls.

5. The method of producing a quick-frozen wrapped block of a normally flowable food product comprising filling said product into a flexible rectangular container while confining the sides of said container to maintain its shape, closing the mouth of said container, folding said mouth and applying yielding pressure thereto to form a rectangular end, and then subjecting the confined container to refrigeration to quick-freeze its contents while maintaining said pressure.

6. The method of producing a quick-frozen wrapped block of a normally flowable food product which comprises filling said product into a flexible rectangular container while confining the sides of the container to maintain its shape, closing the mouth of said container tightly around the confined product to eliminate air and then sealing said mouth, folding the sealed mouth and applying yielding pressure thereto to form a rectangular end, and then subjecting the confined container to refrigeration to quick-freeze its contents while maintaining said pressure.

7. The method of producing a quick-frozen wrapped block of a normally flowable food product which comprises filling said product into a flexible rectangular container while confining the sides of the container to maintain its shape, closing the mouth of the container, folding the mouth and applying yielding pressure thereto to form a rectangular end, and quick-freezing said product by placing said confined container between horizontal refrigerated plates while maintaining said pressure.

8. The method of producing a quick-frozen wrapped block of a normally flowable food product which comprises filling said product into a flexible rectangular container while confining said container to maintain its shape, closing the mouth of said container tightly around the confined product to eliminate air and sealing said mouth, folding the sealed mouth and applying yielding pressure thereto to form a rectangular end, and quick-freezing said product by placing said confined container between horizontal refrigerated plates while maintaining said pressure.

9. The method of producing a quick-frozen wrapped block of a normally flowable food product which comprises filling said product into a flexible rectangular bag having a flat thin shape, sealing and folding the mouth of the bag, refrigerating said bag between and with its wide sides in contact with horizontal refrigerated surfaces maintained at a temperature sufficiently low to quick-freeze said product, and maintaining contact with said surfaces by confining the narrow sides and the ends of the bag and applying yielding pressure to at least one thereof.

10. The method of producing a quick-frozen wrapped block of a normally flowable food product which comprises filling said product into a flexible rectangular bag having a flat thin shape, sealing and folding the mouth of the bag, refrigerating said bag between and with its wide sides in contact with horizontal refrigerated surfaces maintained at a temperature sufficiently low to quick-freeze said product, and maintaining contact with said surfaces by confining the narrow sides and one end of the bag while applying yielding pressure to the mouth end of the bag.

JOSEPH E. GUINANE.